United States Patent
Ohta

(10) Patent No.: US 6,751,171 B2
(45) Date of Patent: *Jun. 15, 2004

(54) METHOD AND APPARATUS FOR CONTROLLING SERVO LOOP AMPLIFICATION ACCORDING TO WOBBLE SIGNALS FORMED IN A GUIDE GROOVE OF AN OPTICAL DISC

(75) Inventor: Shinji Ohta, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 63 days.

(21) Appl. No.: 09/216,038

(22) Filed: Dec. 18, 1998

(65) Prior Publication Data

US 2002/0101797 A1 Aug. 1, 2002

(30) Foreign Application Priority Data

Dec. 26, 1997 (JP) .......................... P9-361059

(51) Int. Cl.[7] .............................................. G11B 7/095
(52) U.S. Cl. ................. 369/44.13; 369/44.26; 369/44.36
(58) Field of Search .................. 369/44.13, 44.29, 369/124.14, 124.13, 44.36

(56) References Cited

U.S. PATENT DOCUMENTS

| | | | | |
|---|---|---|---|---|
| 4,363,116 A | * | 12/1982 | Kleuters et al. | ............... 369/30 |
| 4,866,688 A | * | 9/1989 | Ohtake et al. | ........... 369/44.13 |
| 4,951,273 A | * | 8/1990 | Yoshida et al. | ......... 369/124.11 |
| 5,175,719 A | * | 12/1992 | Iimura | ..................... 369/44.29 |
| 5,383,169 A | * | 1/1995 | Shinoda et al. | .......... 369/44.13 |
| 5,416,759 A | * | 5/1995 | Chun | ...................... 369/44.36 |
| 5,487,056 A | * | 1/1996 | Wachi | ..................... 369/44.34 |
| 5,537,373 A | | 7/1996 | Horikiri | |
| 5,583,837 A | * | 12/1996 | Ogino et al. | .............. 369/44.36 |
| 5,615,185 A | | 3/1997 | Horikiri | |
| 5,764,605 A | * | 6/1998 | Zucker et al. | ........... 369/44.29 |
| 5,875,157 A | * | 2/1999 | Sasaki et al. | ............ 369/44.29 |
| 5,930,211 A | * | 7/1999 | Sasaki | ...................... 369/44.29 |
| 5,982,722 A | * | 11/1999 | Hashimoto | ............... 369/44.29 |
| 6,011,762 A | * | 1/2000 | Watanabe et al. | ........ 369/44.27 |
| 6,081,490 A | * | 6/2000 | Kuroda et al. | ........... 369/44.28 |
| 6,115,333 A | * | 9/2000 | Igarashi | .................... 369/44.27 |

FOREIGN PATENT DOCUMENTS

| | | |
|---|---|---|
| EP | 0210330 A2 | 2/1987 |
| WO | WO95/31806 | * 11/1995 |

OTHER PUBLICATIONS

Electronic Circuits Discrete and Integrated, Shiling and Belove, 1968, p. 268.*

* cited by examiner

Primary Examiner—Aristotelis M. Psitos
(74) Attorney, Agent, or Firm—Oblon, Spivak, McClelland, Maier & Neustadt, P.C.

(57) ABSTRACT

A recording and/or reproducing apparatus for an optical disc in which the loop gain variation in tracking servo control can be suppressed to cause the illuminated laser light to follow correctly the recording track center. An optical disc recording/reproducing device 1 detects a traversing signal generated when the laser light traverses a track at the time of tracking servo pull-in and sets the amplification degree of a GCA 4 so that the push-pull signals will be at a predetermined level. The optical disc recording/reproducing device 1 holds the amplitude of the wobbling signals on memory as an initial setting value. On starting the recording or reproduction, the optical disc recording/reproducing device 1 monitors the amplitudes of the wobbling signals during the recording or reproduction to compare the amplitudes to the initial setting value. The optical disc recording/reproducing device 1 sets the amplification degree in meeting with the ratio of increase or decrease of the wobbling signals to control the GCA 4 and the gain of the push-pull signals.

12 Claims, 7 Drawing Sheets

METHOD AND APPARATUS FOR CONTROLLING SERVO LOOP AMPLIFICATION ACCORDING TO WOBBLE SIGNALS FORMED IN A GUIDE GROOVE OF AN OPTICAL DISC

BACKGROUND OF THE INVENTION

1. Field of the Invention

This invention relates to a recording and/or reproducing apparatus for recording or reproducing an optical disc under tracking servo control, and to a tracking control method for an optical disc.

2. Description of the Related Art

In an optical disc drive device, recording or reproducing data for an optical disc in general, a tracking servo loop is formed for performing loop control, in order to permit a laser light beam radiated from an optical pickup to follow accurately the track center position of the optical disc.

Specifically, the tracking servo loop is completed in the following manner in an optical disc driving device. That is, the optical disc driving device radiates a laser light beam on a track of an optical disc from the optical pickup to detect the reflected laser light bean by a photodetector, which then detects the reflected light to send a detection signal corresponding to the light volume of the reflected light to a matrix amplifier. The latter converts the detection signal to a voltage level signal, while generating tracking error signals representing the position offset components of the laser light spot with respect to the track center. The tracking error signals are phase compensated in a pre-set manner by a filter and thence supplied to a tracking driver adapted for driving a biaxial actuator adapted in turn for causing movement of the objective lens of the optical pickup. The tracking driver is responsive to the phase-compensated tracking error signals to drive the tracking coil of the biaxial actuator to cause movement of the objective lens vertically with respect to the optical axis and radially with respect to the optical disc.

The optical disc drive device completes a tracking servo loop as described above to correct the position deviation of the laser spot to cause the laser light illuminated on the optical disc to follow the track center by way of tracking control.

It should be noted that, in the conventional optical disc driving device, there are produced variations in the tracking servo loop gain, from one optical disc to another, due to a difference in the intensity of the reflected light or in an intensity distribution. In particular, since the tracking error signals are produced on the basis of push-pull signals representing the difference in reflected light volume obtained from both edges of the guide groove formed in the track, there is produced a significant difference in sensitivity due to the difference in the intensity of the reflected light or in the intensity distribution. Thus, for eliminating the variations in the loop gain, the conventional optical disc driving device detects traverse signals produced when the laser light traverses the track, such as at the time of optical disc loading or tracking pull-in, and performs calibration, etc., to assure a constant amplitude of the traversing signal to adjust the loop gain.

Meanwhile, in the conventional optical disc driving device, the loop gain for tracking servo control fluctuates due to the flexure or distortion of the recording surface, thermal changes or changes with lapse of time, even in the course of the recording/reproduction of the same optical disc. In particular, if data are continuously recorded or reproduced over a wide range of tracks of the optical disc for recording/reproducing a large quantity of data or for a prolonged time period, the risk is high that differences in reflection intensities or intensity distribution will be produced with the result that the loop gain tends to fluctuate.

Recently, with the increased capacity of the optical disc, the objective lens tends to be increased in numerical aperture (NA), while the laser light tends to be reduced in wavelength, with the result that the disc thickness is increasingly reduced. Thus, the effect of warping of the optical disc tends to be manifest, such that the reflection intensity or intensity distribution tends to be produced in the course of recording or reproduction to render the loop gain more susceptible to fluctuations.

However, since the conventional optical disc driving device detects the traverse signal to adjust the loop gain, it is necessary to interrupt the tracking servo loop transiently to adjust the loop gain. Thus, in the conventional optical disc driving device, if the loop gain fluctuates, it has not been possible to adust the loop gain in real time.

Therefore, if, in the conventional optical disc driving device, data is to be recorded or reproduced over a wide area of the optical disc for recording/reproducing a large quantity of data or for prolonged time, it has been difficult to assure tracking servo stability.

SUMMARY OF THE INVENTION

It is therefore an object of the present invention to provide an optical disc recording and/or reproducing method and apparatus and an optical disc tracking control method whereby loop gain variations in the tracking servo control can be suppressed in real-time to enable the illuminating laser light to follow the track center position accurately.

In one aspect, the present invention provides a data recording/reproducing apparatus for an optical disc, the optical disc having a recording track carrying a guide groove for causing an illuminated laser spot to follow the center position of the recording track, the guide groove being meanderingly formed in meeting with wobbling signals of a pre-set frequency, in which the apparatus includes push-pull signal detection means for detecting push-pull signals containing tracking error signals representing error components from the track center and the wobbling signals, wobbling signal detection means for detecting the wobbling signals from the push-pull signals detected by the detection means, and control means for controlling the level of at least the tracking error signals in meeting with the level of the detected wobbling signals.

In the optical disc recording and/or reproducing apparatus, the tracking error signal level is controlled responsive to the detected wobbling signal level to adjust the tracking servo loop gain.

In another aspect, the present invention provides an optical disc tracking controlling method for an optical disc, the optical disc having a recording track carrying a guide groove for causing an illuminated laser spot to follow the center position of the recording track, the guide groove being meanderingly formed in meeting with wobbling signals of a pre-set frequency, in which the method includes detecting push-pull signals containing tracking error signals representing error components from the track center and the wobbling signals, detecting the wobbling signals from the detected push-pull signals to control the level of at least the tracking error signals in meeting with the level of the detected wobbling signals, and detecting the level-controlled tracking error signals from the detected push-pull signals to control the position of a laser spot illuminated on the optical disc based on the tracking error signals.

In the optical disc recording and/or reproducing method, the tracking error signal level is controlled responsive to the detected wobbling signal level to adjust the tracking servo loop gain.

In the optical disc recording and/or reproducing apparatus and the optical disc tracking controlling method, according to the present invention, the tracking error signal level is controlled responsive to the detected wobbling signal level to control the tracking error signal level and the tracking servo loop gain.

According to the present invention, if the loop gain of the tracking servo control is varied during recording or reproduction due to flexure or distortion of the recording surface of the same optical disc, thermal changes or to changes with lapse of time, it is possible to suppress the variation in the loop gain in the tracking servo control in real time to cause the illuminated laser light to follow the center of the recording track reliably.

Moreover, according to the present invention, it is possible to suppress the loop gain variation over the entire data recording or reproducing area in case of continuous data recording or reproduction on a broad area of an optical disc, such as when recording or reproducing a large quantity of data or over an extended period of time, to cause the illuminated laser light to follow the recording track center.

DESCRIPTION OF THE PREFERRED EMBODIMENTS

Figure 1:
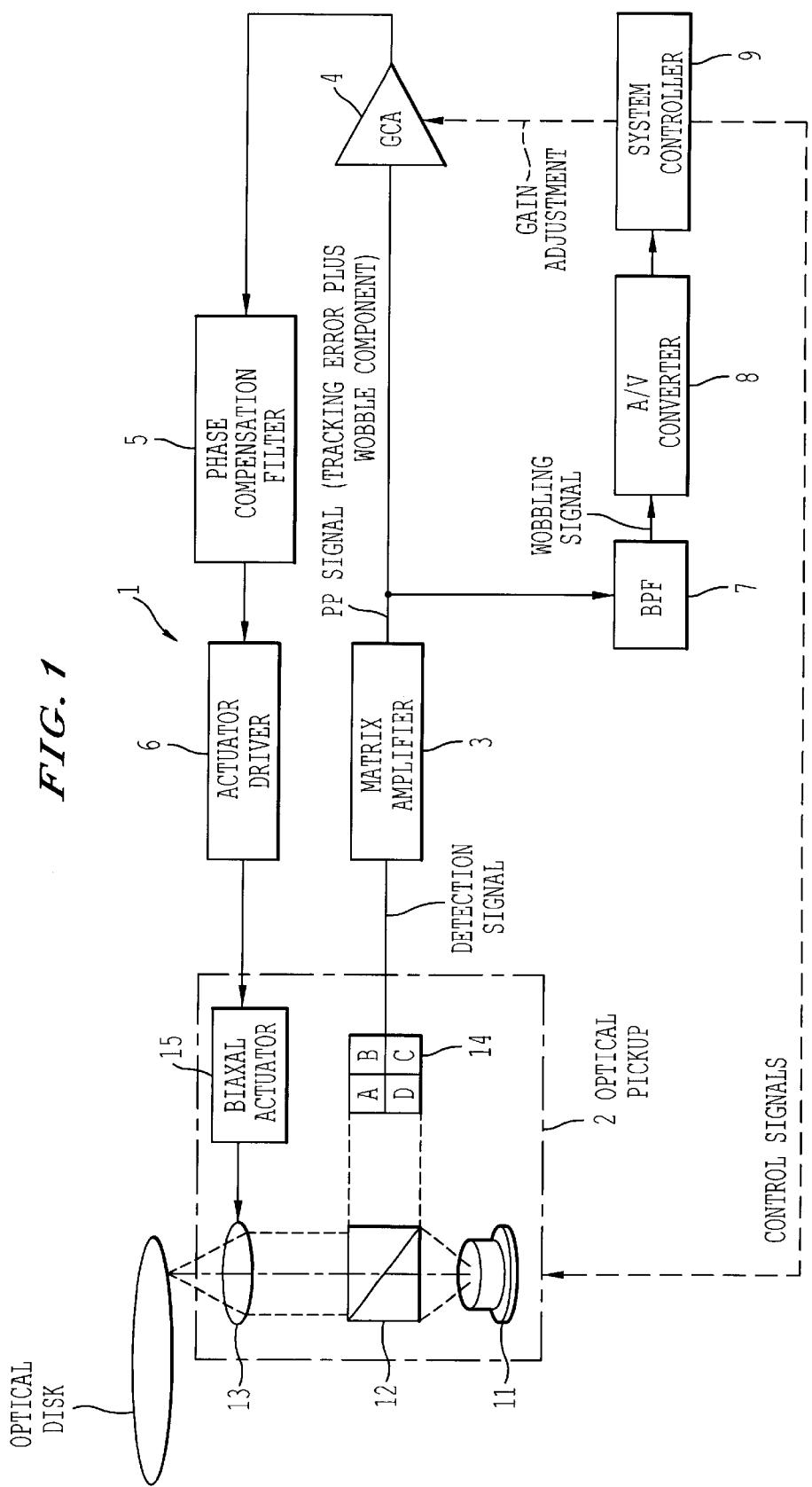
FIG. 1 is a block diagram of an optical disc driving device embodying the present invention.

Referring to the drawings, an optical disc driving device according to a preferred embodiment of the present invention will be explained in detail. The optical disc driving device of the present embodiment is adapted for recording and/or reproducing data for an optical disc.

FIG. 1 shows a block diagram of an optical disc driving device embodying the present invention.

The optical disc driving device 1 includes an optical pickup 2 for radiating a laser light beam to an optical disc D for detecting the reflected light, a matrix amplifier 3 for generating playback signals (RF signals), focusing error signals (FE signals) or push-pull signals (PP signals), etc., from the detection signals of the optical pickup 2, a gain control amplifier (GCA) 4 for amplifying PP signals generated by the matrix amplifier 3, a phase compensation filter 5 for phase-compensating the PP signals amplified by the gain control amplifier 4, an actuator driver 6 for driving a bi-axial actuator 15 of the optical pickup 2 based on the PP signals phase-compensated by the phase compensation filter 5, and a band-pass filter 7 adapted for detecting wobbling signals detected by the matrix amplifier 3. The optical disc driving device 1 also includes an A/D converter 8 for digitizing the wobbling signals detected by the bandpass filter 7 and a system controller 9 adapted for controlling the amplification degree of the gain control amplifier 4 based on the wobbling signals digitized by the A/D converter 8.

The optical pickup 2 radiates the laser light radiated from a laser diode 11 via an optical system comprised of a polarizing beam splitter 12 and an objective lens 13 to a track on the optical disc D to detect the reflected laser light by a photodetector 14. The optical pickup 2 includes the bi-axial actuator 15 for moving the objective lens for producing the just-focus and just-track conditions of the laser light illuminated on the optical disc D.

Figure 2:
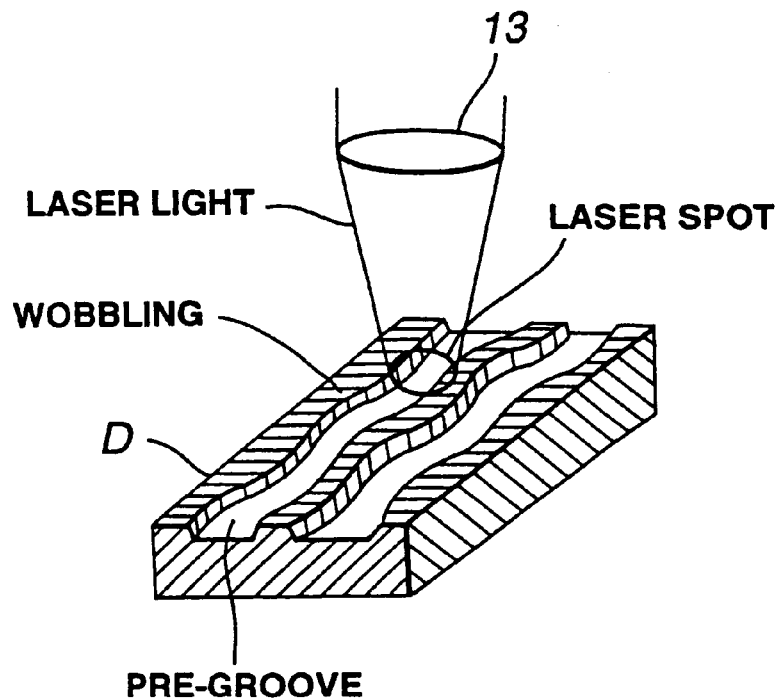
FIG. 2 illustrates an optical disc adapted for recording/reproduction by the optical disc driving device shown in FIG. 1.
Figure 3:
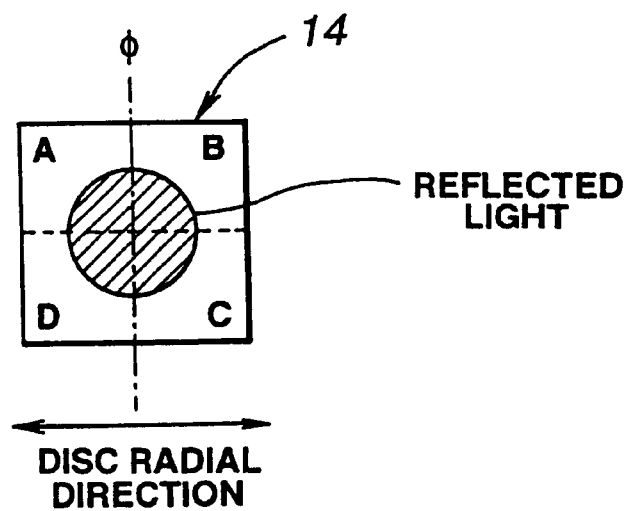
FIG. 3 illustrates a typical photodetector of the optical disc driving device.
Figure 4:
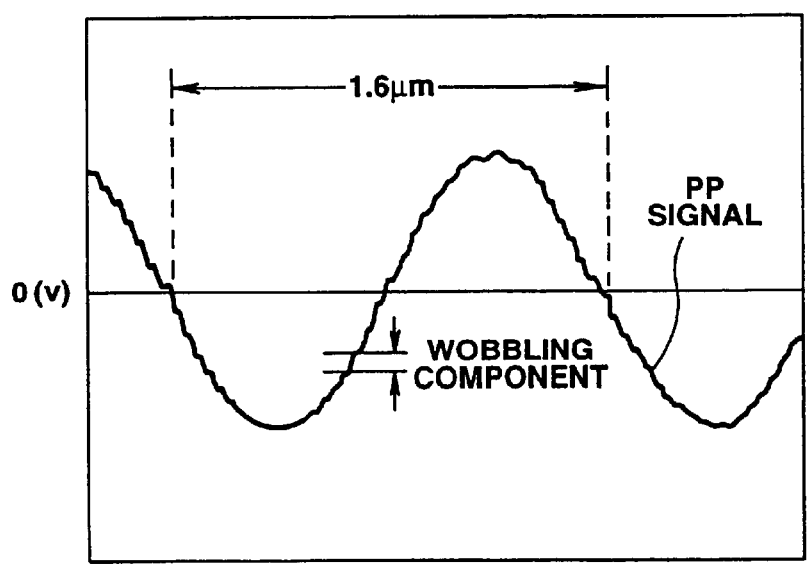
FIG. 4 is a waveform diagram for illustrating push-pull signals detected by the optical disc driving device.

In the track of the optical disc D, adapted to be recorded or reproduced by the optical disc recording/reproducing device 1, there is formed a guide groove, termed a pre-groove, to cause a light spot of a laser light beam illuminated via objective lens 13 to follow the track center, as shown in FIG. 2. On the optical disc D, there are also recorded wobbling signals for controlling the rotational speed or for serving as the track address information by meandering the pre-groove.

The photodetector 14 of the optical pickup 2 detects the reflected light of the optical disc D, on the track of which the pre-groove is formed as described above, to send detection signals to the matrix amplifier 3.

The matrix amplifier 3 converts the detection signals from the photodetector 14 into voltage signals to produce RF signals, FE signals and PP signals. The RF signals, representing the information recorded on the optical disc D, are detected on the basis of the difference in reflectivity of the pits formed therein, and are generated on the basis of the total reflected light volume from the optical disc D. The FE signals are detected on the basis of the positional difference between the focusing position of the laser light and the recording layer of the optical disc D and are generated using a system termed the astigmatic system.

That is, the tracking error signals and the wobbling signals are contained in the PP signals generated by the matrix amplifier 3. If the optical disc is of the compact disc recordable (CD-R) type, there is contained in the PP signal a wobbling component with the amplitudes of 25 to 36 nm for a track pitch of 1.6 μm as specified by the corresponding standard. These wobbling signals are of an amplitude of 25 to 36 nm on the entire disc surface of the optical disc D extending from the innermost rim to the outermost rim of the disc.

The RF signals are sent from the matrix amplifier 3 to an RF signal processor, etc. (not shown), and are thereby processed with convert-to-binary, eight-to-fourteen demodulation or error correction, so as to be outputted via an interface to external equipment. The RF signals are sent from this matrix amplifier 3 to a focusing servo processing unit (not shown). After phase compensation of the FE signals, the focusing servo processing unit drives the bi-axial actuator 15 to cause movement of the objective lens to reduce the FE signals to zero to perform control so that the laser light focusing position will be coincident with the recording layer of the optical disc D.

The RF signals are sent from the matrix amplifier 3 to the gain control amplifier 4 and to the band-pass filter 7.

The gain control amplifier 4 controls the gain of the PP signals, under control by the system controller 9, as later explained, to supply the gain to the phase compensation filter 5.

The phase compensation filter 5 removes disturbances irrelevant to the tracking servo loop control, such as wobbling signal components or data components, and absorbs the disturbances due to eccentricities of optical disc rotation, while performing phase-compensation such as to assure the open-loop servo gain in the low frequency range, in order to send the resulting PP signals to the actuator driver 6.

The actuator driver 6 drives a tracking actuator of the bi-axial actuator 15, based on the phase-compensated PP signals, to cause movement of the objective lens to reduce the tracking error to zero, in order to cause the laser spot illuminated on the optical disc D to follow the track center.

On the other hand, the band-pass filter 7 detects the wobbling signals from the frnished PP signals to send the detected wobbling signals to the A/D converter 8. If the optical disc D is a CD-R, as an example, the band-pass filter 7 retrieves only the band component of 22.05 kHz±1 kHz from the PP signals to send the retrieved band components to the A/D converter 8.

The A/D converter 8 digitizes the detected wobbling signals and sends the digitized wobbling signals to the system controller 9.

The system controller 9 adjusts the gain of the gain control amplifier 4 based on the digitized wobbling signals.

Figure 5:
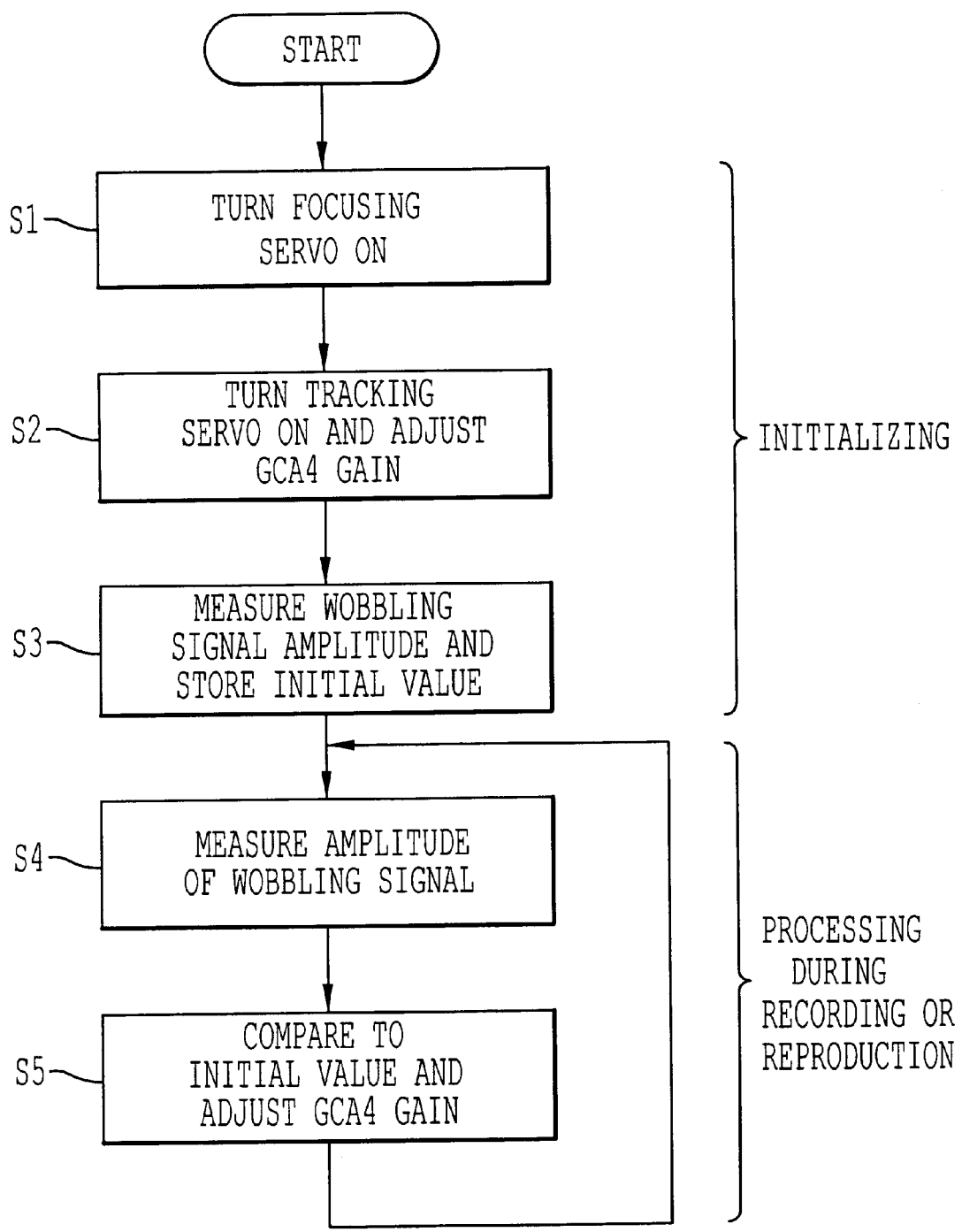
FIG. 5 is a flowchart for illustrating the processing contents of the optical disc driving device.

This system controller 9 adjusts the gain of the gain control amplifier 4 as specified in the flowchart of FIG. 5.

That is, the system controller 9 turns the focusing servo on to pull in the focusing when loading a disc, starting a recording, and starting reproduction (step S1).

The system controller 9 then turns on the tracking servo to complete the tracking servo loop. At this tine, the system controller 9 detects the traverse signals, etc., produced when the laser light traverses the track to set the amplification degree of the gain control amplifier 4, so that the PP signals will be of a predetermined level. For example, the system controller 9 sets the amplification degree so that the peak-to-peak voltage of the traverse signals will be 1 volt (step S2).

The system controller 9 then measures the amplitude of the wobbling signals and stores the amplitude value as an initial setting value. For example, if the peak-to-peak voltage of the wobbling signals is 100 mV, this magnitude is stored (step S3).

The system controller 9 performs the processing of the steps S1 to S3 to initialize processing when loading a disc, starting a recording, and starting playback.

The system controller 9 then measures the amplitude of the wobbling signals at the time of recording or reproducing data for the optical disc D.

The system controller 9 then compares the detected amplitude of the wobbling signals to the amplitude value of the wobbling signals stored as initial setting vales. Based on the results of comparison, the system controller 9 increases or decreases the gain of the gain control amplifier 4. Since the wobbling signals are proportionate to the PP signals, the system controller 9 compares the initial value to the measured value of the wobbling signals to set the amplification degree corresponding to the rate of increase or decrease of the wobbling signals.

That is, since the amplitudes of the wobbling signals, recorded on the entire surface of the optical disc D from its innermost to its outermost rims, are substantially equal, the system controller 9 presumes that the amplitude variations of the detected wobbling signals are proportionate to the amplitude variations of the PP signals and accordingly performs gain adjustment in meeting with the variation ratio.

The system controller 9 performs the processing of step S4 and that of step S5 at all times during data recording and data reproduction to control the gain of the gain control amplifier 4.

By executing the processing from step S1 to step S5, the system controller 9 is able to suppress variations in the push-pull signals during recording or reproduction.

The results of measurement of the push-pull signals, gain-adjusted in the optical disc recording/reproducing device 1 responsive to the variations in the wobbling signals, are now shown. Specifically, FIGS. 6 to 8 illustrate the ratio of the variations of the amplitudes of the push-pull signals, etc., when the commercial CD-R is reproduced from its inner rim up to its outer rim.

Figure 6:
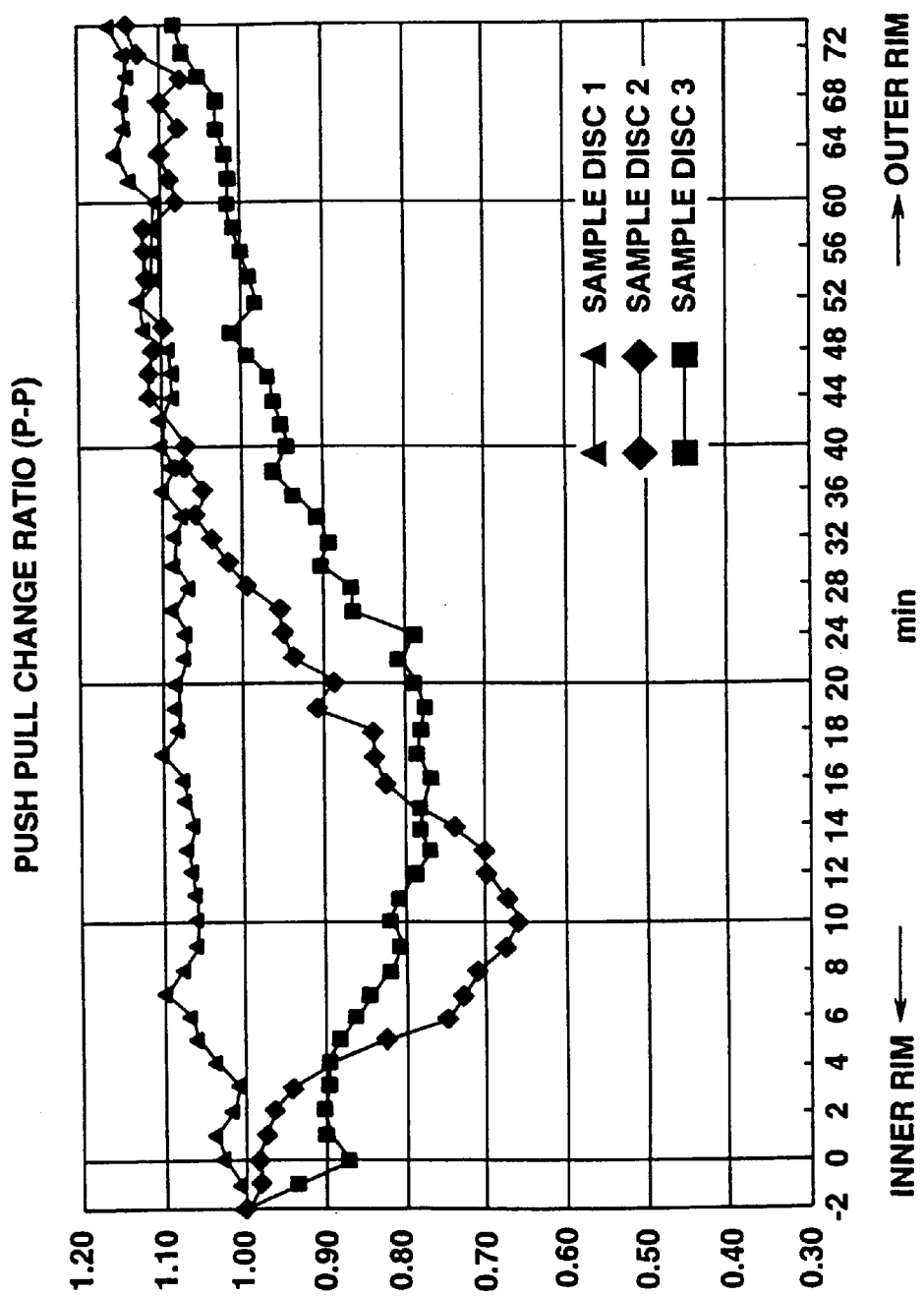
FIG. 6 is a graph for illustrating the rate of change of the amplitudes of the push-pull signals.

FIG. 6 shows the rate of change of the amplitudes of the push-pull signals in case three discs, namely sample discs 1 to 3, are reproduced form the inner rims up to the outer rims without gain adjustment. In FIG. 6, the abscissa and the ordinate denote the data playback time and the rate of change of the amplitudes of the push-pull signals, with the push-pull signal amplitude at the innermost track set to 1, respectively. It is seen from FIG. 6 that the amplitudes of the push-pull signals are varied at the respective positions on the optical disc D.

Figure 7:
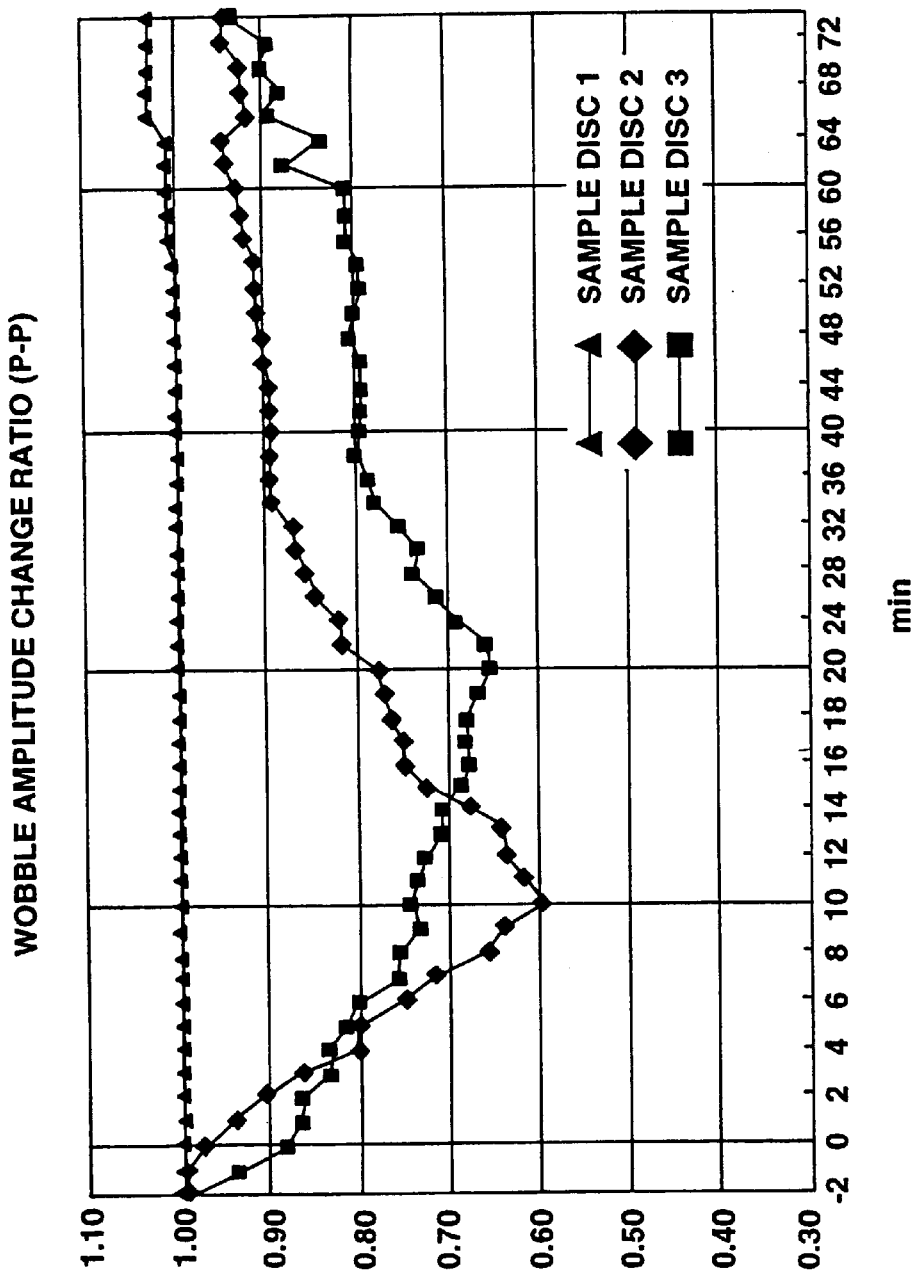
FIG. 7 is a graph for illustrating the rate of change of the amplitudes of the wobbling signals.

FIG. 7 shows the rate of change of the amplitudes of the wobbling signals detected from the three discs, namely sample discs 1 to 3, when these discs are reproduced form the inner rims up to the outer rims. In FIG. 7, the abscissa and the ordinate denote the data playback time and the rate of change of the amplitudes of the push-pull signals with the push-pull signal amplitude at the innermost track being set to 1, respectively. It is seen from FIG. 7 that the amplitudes of the wobbling signals are proportionate to the amplitudes of the push-pull signals.

Figure 8:
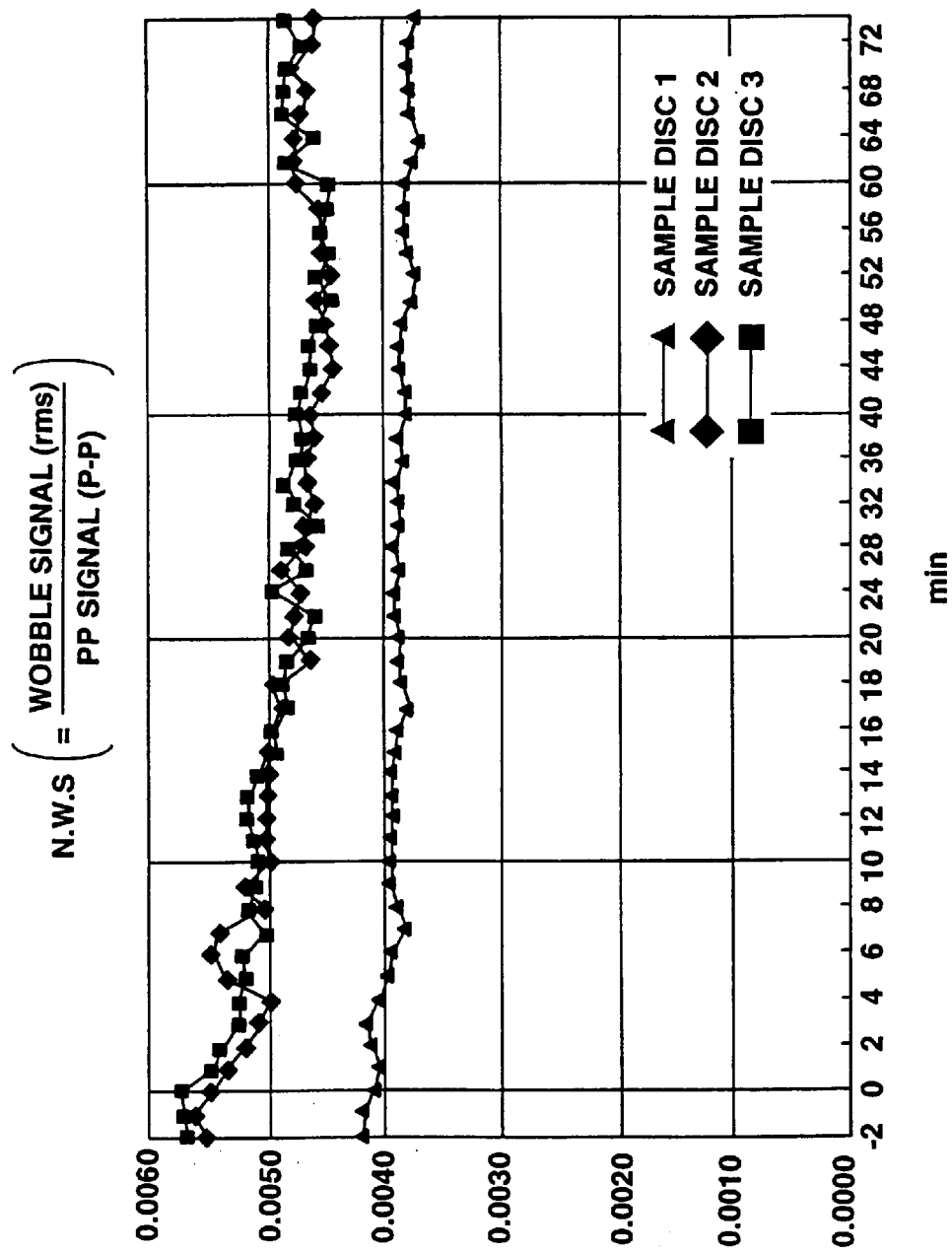
FIG. 8 is a graph for illustrating the rate of change of the amplitudes of the push-pull signals normalized by the push-pull signals.

FIG. 8 shows the rate of change of the amplitudes of the push-pull signals, detected from the three discs, namely sample discs 1 to 3, and which are then normalized with the wobbling signals. In FIG. 8, the abscissa denote the data playback time and the ordinate the rate of change of the amplitudes of the push-pull signals with the push-pull signal amplitude at the innermost track being set to 1. It is seen from FIG. 8 that amplitude variations can be suppressed by normalizing the push-pull signals with the wobbling signals.

Thus, with the optical disc recording/reproducing device 1, in which the system controller 9 controls the push-pull signal level depending on the level of the detected wobbling signals to adjust the tracking servo loop gain, the loop gain variations in tracking servo control can be suppressed to permit the illuminated laser light to follow the track center even if the loop gain of the tracking servo control is varied during recording or reproduction under the effect of flexure or distortion of the recording surface, thermal changes or changes with lapse of time of the optical disc D.

In the above-described optical disc recording/reproducing device 1, the wobbling signals are detected on the basis of the push-pull signals directly outputted by the matrix amplifier 3 to adjust the gain of the push-pull signals outputted by the matrix amplifier 3. The gain adjustment system in the present invention is not limited to this illustrated system because it is only sufficient if the gain of the tracking error signals contained in the push-pull signals can be adjusted in meeting with the wobbling signals.

For example, the wobbling signals outputted by the gain control amplifier 4 can be detected and the gain of the gain control amplifier 4 adjusted so that the wobbling signals will be constant by way of performing feedback control. Alternatively, the wobbling signals can be detected to control the intensity of the laser light radiated from the laser diode 11.

What is claimed is:

1. A data recording/reproducing apparatus for an optical disc, said optical disc comprising a recording track carrying a guide groove for causing an illuminated laser spot to follow a center position of said recording track, said guide groove being meanderingly formed according to wobbling signals of a pre-set frequency, said apparatus comprising:
   a) push-pull signal detection means for detecting push-pull signals containing:
      1) tracking error signals representing error components from said track center; and
      2) said wobbling signals according to which said guide groove is meanderingly formed;
   b) wobbling signal detection means for detecting said wobbling signals from said push-pull signals detected by said push-pull signal detection means; and
   c) control means for controlling a loop gain of at least a tracking servo according to a level of said detected wobbling signals, wherein the loop gain is adjusted in real time without interrupting the tracking servo.

2. The recording/reproducing apparatus according to claim 1, wherein said control means controls an amplification factor of said tracking error signals detected from said push-pull signals.

3. The recording/reproducing apparatus according to claim 1, further comprising a laser which emits a laser beam to produce said illuminated laser spot, wherein said control means controls said laser to regulate an intensity of said laser beam according to said wobbling signals.

4. The recording/reproducing apparatus according to claim 1, wherein said control means measures an amplitude value of the wobbling signals during at least at one of a disc loading time point, a recording starting time point and a playback starting time point and holds the measured amplitude value as an initial setting value.

5. The recording/reproducing apparatus according to claim 4, wherein said control means measures said amplitude value of said detected wobbling signals during data recording on said optical disc or during data reproduction from said optical disc and compares said measured amplitude value to said initial setting value to control an amplification degree of said push-pull signals.

6. A optical disc tracking controlling method for an optical disc, said optical disc comprising a recording track carrying a guide groove for causing an illuminated laser spot to follow a center position of said recording track, said guide groove being meanderingly formed according to wobbling signals of a pre-set frequency, said method comprising:
   a) detecting push-pull signals containing:
      1) tracking error signals representing error components from said track center; and
      2) said wobbling signals according to which said guide groove is meanderingly formed;
   b) detecting said wobbling signals from said detected push-pull signals to control a loop gain of a tracking servo according to a level of said detected wobbling signals, thereby adjusting said loop gain in real time without interrupting the tracking servo; and
   c) detecting tracking error signals, subjected to said controlling of the loop gain, from said detected push-pull signals to control a position of said laser spot illuminated on said optical disc based on said tracking error signals.

7. The optical disc tracking controlling method according to claim 6, wherein said step of controlling said loop gain includes controlling an amplification factor of said tracking error signals detected from said push-pull signals.

8. The optical disc tracking controlling method according to claim 6, further comprising the step of controlling an intensity of said laser spot according to said wobbling signals.

9. A data reproducing apparatus for an optical disc, said optical disc comprising a recording track carrying a guide groove for causing an illuminated laser spot to follow a center position of said recording track, said guide groove being meanderingly formed according to wobbling signals of a pre-set frequency, said apparatus comprising:
   a) a photodetector for detecting light reflected from said recording track and said guide groove and for generating a detection signal;
   b) a matrix amplifier for processing said detection signal and for generating push-pull signals, wherein said push-pull signals include:
      1) tracking error signals; and
      2) wobbling signals according to which said guide groove is meanderingly formed;
   c) a band-pass filter for detecting said wobbling signals included in said push-pull signals;
   d) a gain control amplifier; and
   e) a system controller for controlling said gain control amplifier to regulate a loop gain of a tracking servo according to a level of said detected wobbling signals, wherein a loop gain is adjusted in real time without interrupting the tracking servo.

10. The data reproducing apparatus of claim 9, further comprising a laser for illuminating said optical disc, wherein said system controller controls a power level of said laser.

11. The data reproducing apparatus of claim 9, further comprising a memory, wherein said system controller measures an amplitude of said wobbling signals during at least one of a disc loading time, a time when recording is started and a time when playback is started and stores said measured value in the memory as an initial setting value.

12. The data reproducing apparatus of claim 11, wherein said system controller measures an amplitude of said wobbling signals during a time data is recorded on said optical disc and compares a measured amplitude to said initial setting value to control an amplification degree of said push-pull signals.

* * * * *